March 2, 1937.　　　G. R. HAUB　　　2,072,502
GLASS TRANSFER MECHANISM
Filed June 18, 1935　　　3 Sheets-Sheet 3

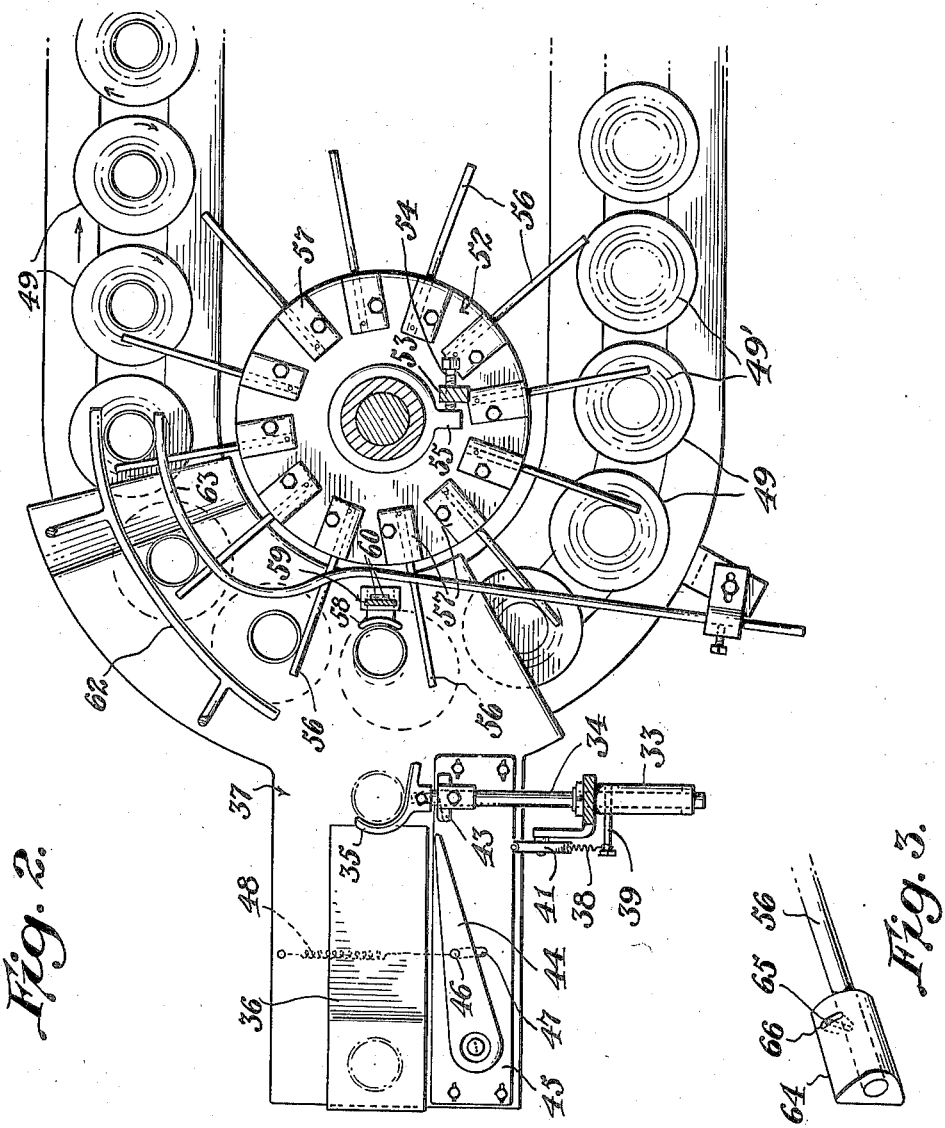

Inventor
George R. Haub
By Eccleston & Eccleston
Attorneys

Patented Mar. 2, 1937

2,072,502

UNITED STATES PATENT OFFICE 2,072,502

GLASS TRANSFER MECHANISM

George R. Haub, Zanesville, Ohio, assignor to Hazel-Atlas Glass Company, Wheeling, W. Va., a corporation of West Virginia Application June 18, 1935, Serial No. 27,267

13 Claims. (Cl. 198—20)

The invention relates to apparatus for automatically handling glassware, and particularly for transferring glass articles from a forming machine to the discs or cups of a continuously moving glazer conveyer.

One of the objects of the invention is to provide improved and simplified means for removing ware from the molds of a press or other forming machine and transferring the ware to the desired point of delivery.

Another object of the invention is to provide improved and simplified means for conveying ware from the point where it is delivered to mechanism for positioning it on the cups or discs of a glazer conveyer.

A further object of the invention is to provide improved and simplified means for arranging the ware on the glazer discs in accurately centered position.

Various other objects and advantages of the invention will be apparent to those skilled in the art from the following detailed description, when taken in connection with the accompanying drawings, in which, Figure 1 is a perspective view of the apparatus.

Figure 2 is a horizontal sectional view showing the parts associated with the forward end of the glazer.

Figure 3 is a detail view of a modified form of finger.

Figure 1:
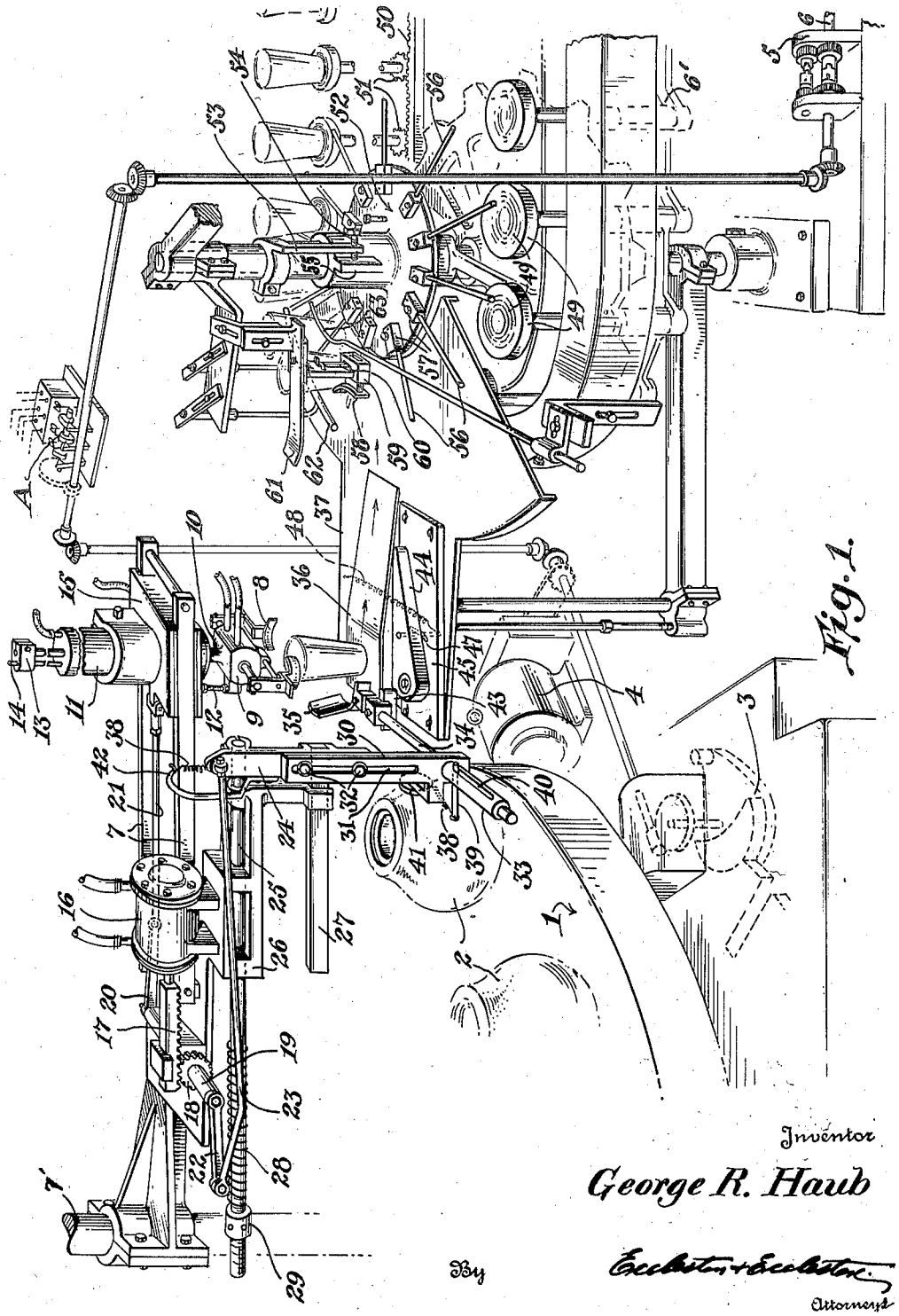

Referring to the drawings in detail, numeral 1 refers to the table of a glass press, carrying molds 2. While the invention is illustrated in connection with a press, it is to be understood that it can be used with other types of forming machines.

In the specific arrangement illustrated the table of the press is rotated step-by-step, preferably by an ordinary Geneva stop mechanism 3, which is driven by a motor 4. This motor imparts a step-by-step movement to the press, and a continuous movement to the glazer conveyer. The connections between the motor and the glazer are illustrated more or less diagrammatically. Figure 1 shows appropriate shafting leading from the motor to any desirable form of gear shift device 5. The shaft 6 leading from the gear shift device drives the glazer conveyer 6'. In the particular form illustrated a tumbler, or other desired article, is placed on every cup or disc of the glazer. But in instances where relatively large articles are being handled, such as plates or bowls, the discs are too closely arranged to have an article delivered to every disc, and by shifting the gears the speed relation will be changed so that an article will be delivered to every other disc.

Numeral 7 refers to a pair of guide rails which are carried by any suitable standard 7'. The guide rails are arranged over the station where the ware is lifted from the molds, and the rails extend beyond the molds to the point where the ware is to be delivered. It is understood, of course, that in the usual practice the formed articles are elevated in the molds at the station where they are to be removed, and numeral 8 refers to a pair of grippers for gripping the elevated articles. These grippers are opened and closed by a cylinder 9 carried by the piston 10 of a cylinder 11. After the grippers have been closed the article is lifted clear of the mold by the cylinder 11. The limit of upward movement of the grippers is varied and controlled by means of an adjustable stop 12. The downward limit of movement is varied and controlled by the member 13 which is adjustably clamped on the upper end of the piston 10, and this clamp travels on a guide rod 14, thereby preventing rotation of the piston and the cylinder 9 and grippers 8 carried thereby.

The cylinder 11 is mounted on a carriage 15, which carriage travels back and forth on the rails 7. The operation of the carriage is controlled by a cylinder 16. The piston of this cylinder carries a rack 17 which meshes with a pinion 18 fixed to a shaft 19. A crank arm 20 is fixed to one end of the shaft, and this crank arm is connected with the carriage 15 by means of a connecting rod 21. It is thus apparent that when the rack 17 is moved in one direction by the cylinder 16, the crank 20 will cause the carriage 15, carrying the pick-up mechanism, to move to a position over the mold at the station where the articles are removed; and that when the rack is moved in the opposite direction the carriage with the pick-up mechanism gripping the article will be moved to the point where the article is to be delivered.

The cylinder 16 not only causes the pick-up mechanism to travel back and forth but also causes a pusher bar to travel back and forth, in unison with the travel of the pick-up mechanism, as will now be described. Attached to the opposite end of the shaft 19 is a crank arm 22; the crank arms 20 and 22 being oppositely disposed on the shaft, so that when the shaft is rocked, the pick-up mechanism and pusher bar will move in opposite directions.

A connecting rod 23 connects the crank 22 with a bracket 24 which is adjustably clamped on a slide rod 25 which is slidably mounted in a bearing member 26. The bracket 24 is preferably provided with a guide and steadying rod 27.

The bracket is thus moved back and forth by the oscillation of the crank 22, and the shock at the forward end of the stroke is preferably absorbed by a coil spring 28 mounted on the slide rod between a nut 29 and the slide bearing 26. The spring can be adjusted by means of the nut.

A frame 30 is mounted for vertical adjustment on the bracket 24, as by means of slot 31 and bolts 32. Fixed in the lower end of the frame 30 is a sleeve 33 in which is slidably mounted a pusher bar 34. If desired the pusher bar may be provided with a rounded element 35 to contact with the article to be conveyed, or the pusher bar itself may contact with the article.

In the specific form illustrated the pick-up mechanism delivers the tumbler or other article to a ramp 36, though of course it could be delivered directly to a dead pan 37, if preferred. When the crank 22 moves in one direction the pusher bar 34 will push the tumbler forward down the ramp and into association with the parts which will deliver it, in centered position, on the discs or cups of the glazer. The forward movement of the pusher bar is rather rapid so that after the pusher bar has reached the forward limit of its movement, the tumbler or other article will travel, under its own momentum, into position to be delivered to the glazer cups. When the crank 22 moves in the opposite direction the pusher bar will be returned to its original position.

It will be apparent, however, that in addition to the back and forth movement of the pusher bar, it must also be moved laterally, for otherwise it would interfere with the oncoming ware. In the specific form illustrated the means for effecting the lateral movement includes a spring 38 which has one end connected with a pin 39 fixed to the pusher bar and slidably mounted in slots 40 provided in the sleeve 33. The spring passes under a roller 41 and then upwardly to a point where it is secured to a finger 42 mounted on the bracket 24. Thus the spring tends to force the pusher bar 34 across the ramp 36 (or dead pan 37) whenever the bar is free to move in that direction. In Figure 1 the pusher bar has been moved laterally into position behind the tumbler, by this spring 38.

Fixed to the pusher bar 34 is a lug or traveler 43, and mounted in the path of this traveler is a cam or switch 44, which is tapered forwardly. In the specific form illustrated this cam has its rear end pivotally mounted on a plate 45; the plate being adjustably mounted on the dead pan 37. The cam or switch is urged to the position shown in Figure 1 by any desired means, as by a pin 46 which projects through an arcuate slot 47 and has a coil spring 48 attached to its lower end; the other end of the coil spring being secured to a hook fixed to the lower side of the dead pan. When the switch 44 is in the position shown in Figure 1 it is in the path of the traveler 43, and thus when the pusher bar moves forward the traveler swings the switch about its pivot, and the instant the traveler passes beyond the end of the switch the spring 48 throws the switch back to its original position. Now when the pusher bar starts its return trip the traveler 43 rides along the opposite side of the cam or switch 44, and thus draws the pusher bar back across the ramp (or dead pan) so that it will not interfere with the next piece of ware delivered by the grippers. And when the return trip of the pusher bar is almost completed the traveler rides off the rear end of the cam, and the spring 38 forces the pusher bar laterally across the ramp, to its original position shown in Figure 1.

The several cylinders referred to hereinbefore are, of course, operated in the proper order to produce the desired operation. Timing mechanisms for producing the desired sequence of operation are well known in the art, and no detailed illustration is necessary. However, in Figure 1, I have illustrated a conventional form of timer A, which is shown as driven by the shafting which is connected with the press and the glazer.

The construction and operation of the preferred form of mechanism for lifting the ware from the molds, delivering the ware to the ramp or dead pan, and then conveying the ware forward to the mechanism for centering it on the glazer cups, will be understod from the foregoing description, and I shall now describe the mechanism for centering the ware on the cups.

Numeral 49 indicates the glazer cups which travel continuously, and which are rotated after receiving the ware which is to be glazed or fire-finished. The discs are rotated by the conventional means, comprising a rack 50 which is engaged by pinion 51 fixed to the spindles of the glazer discs. The surfaces of these cups are, in accordance with the present invention, preferably scored with concentrically arranged circles 49′, so that it can be readily determined whether or not articles are being accurately centered on the cups, and also to aid in the adjustment of the apparatus if the articles are not being accurately centered.

Numeral 52 refers to a centering disc which is loosely mounted on the rotating shaft of the glazer conveyer, and numeral 53 indicates a dog which is clamped to this shaft. A bolt 54 is threaded through the dog and its end engages an abutment 55 on the centering disc. Thus the centering disc is driven with the shaft, but its rotary position with respect thereto and with respect to the glazer cups can be adjusted by the bolt 54.

Radiating from the centering disc 52 are a number of centering fingers 56. In the specific form illustrated these fingers are secured in blocks 57 attached to the centering disc. As indicated in the drawings these fingers project across the glazer cups, and the manner in which they properly line up with the cups will be described hereinafter.

The centering fingers travel across the top of the dead pan 37, and the glazer cups 49 pass beneath the dead pan; the fingers being so positioned as to deliver an article to each cup as it emerges from beneath the dead pan.

Numeral 58 indicates a bumper which is arranged at a higher elevation than the centering fingers, and against which the tumbler or other article strikes when it is delivered by the pusher bar 34. This bumper is preferably so mounted that it can give slightly when the article comes in contact with it. In the specific form illustrated the shank of the bumper 58 is mounted in a slot provided in the holder 59, and this slot is slightly larger than the shank so that the bumper is free to move to a limited extent in all directions. A leaf spring 60 passes through the top of the holder 59 and its lower end is received in an opening (not shown) in the shank of the bumper, thereby resiliently maintaining the bumper in position. The holder 59 is shown as mounted for longitudinal adjustment, by means of a bolt and slot connection, upon a plate 61. This plate projects along the path of the articles to be received, and is arranged at substantially the height of the articles, so that if the articles start to tilt, when being delivered to the bumper, the upper edge of the article will strike the plate 61 and be prevented from capsizing. This plate is mounted for vertical or lateral adjustment, by means of bolt and slot connections, as clearly shown in Figure 1.

Figure 4:
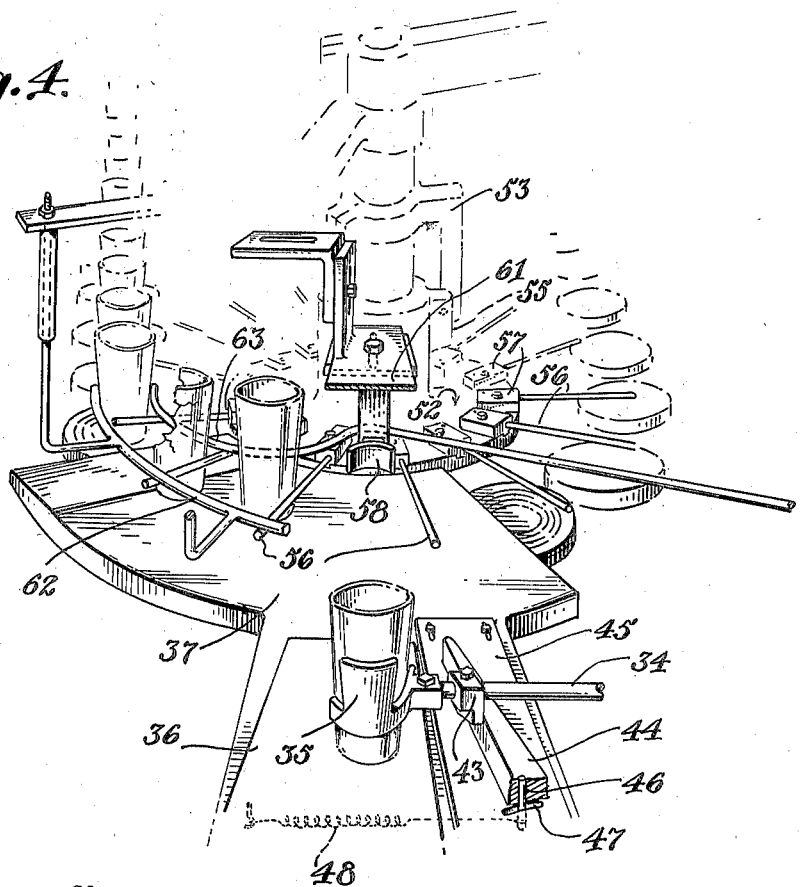
Figure 4 is a perspective view of the forward end of the glazer and the associated parts; and, Figure 5 is a similar perspective view.
Figure 5:
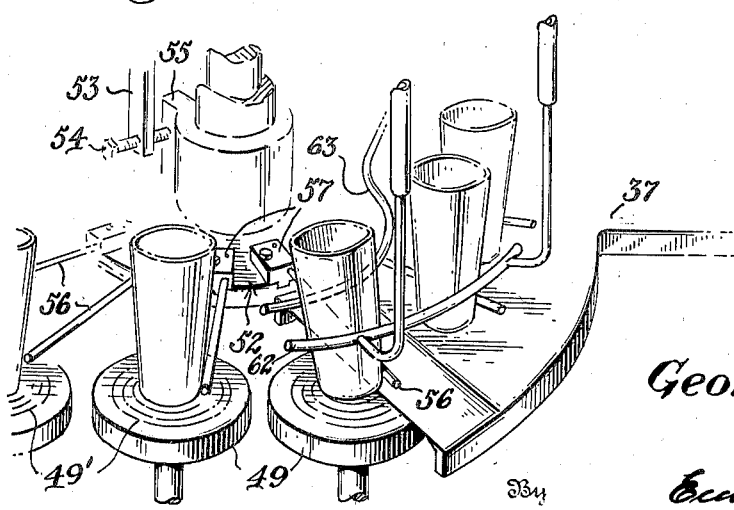

When the tumbler or other article is delivered by the pusher bar 34 it is brought to a stop by the bumper 58, and is directly in the path of one of the continuously revolving centering fingers 56 carried by the centering disc 52. The finger will sweep the article across the surface of the dead pan and onto one of the glazer cups emerging from beneath the dead pan, as best illustrated in Figures 4 and 5. During the travel of the glazer cups and the centering fingers the relation between them varies, but the fingers are so adjusted that each finger will move just far enough over a cup to properly center the article, and upon further movement of the parts the finger passes out of contact with the article, which is being carried away by the glazer conveyer. The scored concentric circles 49' on the glazer cups 49 show whether the articles are accurately centered, and if they are not so centered it is only necessary to adjust the fingers. All of these fingers are simultaneously adjusted by the mere adjustment of the bolt 54. The fingers are adjusted in the same manner when articles of greater or smaller diameter are to be fire polished. As mentioned hereinbefore, when relatively large articles, such as plates or bowls, are to be treated, it may be necessary to place an article on every other cup only, and to accomplish this it is only necessary to operate the gear shift mechanism 5, illustrated more or less diagrammatically in Figure 1.

The mechanism described above accurately and positively centers the ware in one direction, but it is also necessary, of course, to center the ware in the other direction, and this is very easily accomplished by means of guides 62 and 63, which are preferably mounted for adjustment in all directions, as by means of bolt and slot connections, clearly shown in Figure 1. As the fingers sweep the articles forward over the dead pan these guides adjust the articles to the proper position radially of the fingers, so that when the articles are delivered to the glazer cups in the manner described above, they will be centered with respect thereto in all directions. With the articles thus accurately centered they are not thrown off to one side when the glazer cups are rotated during the fire-polishing operation, and they are also in proper position for a fitting operation, if the ware is to be fitted.

In some instances it is desirable to provide the centering fingers with a pad 64 to strike against the ware. This is illustrated in Figure 3. The pad is preferably mounted for slight rotation about the finger, so that it may conform to the side of the article being conveyed. For this purpose the pads are loosely mounted on the fingers, and are permitted to oscillate slightly thereabout by means of a pin 65 which is attached to the finger and projects into a slot 66 provided in the pad.

The operation of the apparatus has been fully described in connection with the description of the preferred construction, and further description is believed to be unnecessary. It should be mentioned, however, that while I have shown and described a particular mechanism for delivering the ware to the centering device, yet the invention is in no manner limited to the particular delivery mechanism shown and described, for obviously many other mechanisms could be employed for delivering the ware to the centering device. In the event that some take-out and delivery mechanism is employed which deposits the ware on the dead pan directly in the path of the centering fingers, then it is obvious that certain parts of the centering mechanism, such as the bumper 58 and the plate 61, will be omitted.

It is apparent that many changes and modifications of the apparatus shown may be made without departing from the spirit of the invention, and all such changes and modifications are intended to be included within the scope of the appended claims.

Having fully described the invention, what I claim is:

1. Mechanism for transferring glass articles to a glazer conveyer having cups which at the receiving end of the conveyer travel in an arcuate path in a horizontal plane, a dead pan beneath which the cups travel, centering fingers traveling over the dead pan in the same arcuate path as the cups and sweeping glass articles from the dead pan onto the cups as they emerge from beneath the dead pan.

2. Mechanism for transferring glass articles to a glazer conveyer having cups which at the receiving end of the conveyer travel in an arcuate path in a horizontal plane, a dead pan beneath which the cups travel, a plurality of centering fingers traveling over the dead pan in the same arcuate path as the cups and sweeping glass articles from the dead pan onto the cups as they emerge from beneath the dead pan, and means for simultaneously adjusting all of the fingers laterally with respect to the cups.

3. Mechanism for transferring glass articles to a continuously moving glazer conveyer having cups which at the receiving end of the conveyer travel in an arcuate path in a horizontal plane, a dead pan beneath which the cups travel, centering fingers traveling over the dead pan in the same arcuate path as the cups and sweeping articles from the dead pan onto the cups as they emerge from beneath the dead pan, scored concentric circles on the cups, and means for adjusting the fingers laterally to center the articles on the cups.

4. Mechanism for transferring glass articles to a continuously moving glazer conveyer having cups which at the receiving end of the conveyer travel in an arcuate path in a horizontal plane, a dead pan beneath which the cups travel, centering fingers traveling over the dead pan in the same arcuate path as the cups and sweeping articles from the dead pan onto the cups as they emerge from beneath the dead pan, scored concentric circles on the cups, and means for simultaneously adjusting all of the fingers laterally to center the articles on the cups.

5. Mechanism for transferring glass articles to a continuously moving glazer conveyer having cups which at the receiving end of the conveyer travel in an arcuate path in a horizontal plane, a dead pan beneath which the cups travel, centering fingers traveling over the dead pan in the same arcuate path as the cups and sweeping glass articles from the dead pan onto the cups as they emerge from beneath the dead pan, and guides between which the articles travel while being swept forward by the fingers to the glazer cups.

6. Mechanism for transferring glass articles to the cups of a continuously moving glazer conveyer including a dead pan beneath which the cups travel, a plurality of centering fingers moving across the dead pan and sweeping glass articles from the dead pan onto the cups as they emerge from beneath the dead pan, a rotating shaft about which the glazer cups travel, a disc rotating with the shaft, said centering fingers carried by the disc, and means for rotatably adjusting the disc with respect to the shaft.

7. Mechanism for transferring glass articles to a glazer conveyer having cups which at the receiving end of the conveyer travel in an arcuate path in a horizontal plane, a dead pan beneath which the cups travel, fingers traveling over the dead pan in the same arcuate path as the cups and sweeping articles from the dead pan onto the cups as they emerge from beneath the dead pan, and means for delivering a glass article in the path of each finger in timed relation therewith.

8. Mechanism for transferring glass articles to the cups of a glazer conveyer including a dead pan beneath which the cups travel, fingers rotating across the dead pan and sweeping articles from the dead pan onto the cups as they emerge from beneath the dead pan, and means for causing articles to travel under their own momentum into the path of the fingers.

9. Mechanism for transferring glass articles to the cups of a glazer conveyer, including a dead pan beneath which the cups travel, fingers rotating across the dead pan and sweeping the articles from the dead pan onto the cups as they emerge from beneath the dead pan, means for causing articles to travel under their own momentum into the path of the fingers, and a bumper to receive the articles before they are carried forward by the fingers.

10. Mechanism for transferring glass articles from a glass forming machine including a dead pan beneath which travel in an arcuate path the cups of a glazer conveyer, fingers traveling over the dead pan in the same arcuate path as the cups and sweeping glass articles from the dead pan onto the cups as they emerge from beneath the dead pan, means for removing formed articles from the molds of a forming machine and delivering the articles in the path of the fingers.

11. Mechanism for transferring glass articles from a glass forming machine including a dead pan beneath which travel in an arcuate path the cups of a glazer conveyer, fingers traveling over the dead pan in the same arcuate path as the cups and sweeping glass articles from the dead pan onto the cups as they emerge from beneath the dead pan, means for removing formed articles from the molds of a forming machine and delivering the articles to the dead pan, and a pusher bar for pushing the articles into the path of the fingers.

12. Mechanism for transferring glass articles from a glass forming machine including a pick-up device for gripping formed glass articles, a dead pan, means for moving the pick-up device to a position over the dead pan, a pusher bar arranged over the dead pan for conveying an article delivered by the pick-up device, a rock shaft, and means operated by the shaft for simultaneously moving the pusher bar and pick-up device in opposite directions.

13. Mechanism for transferring glass articles from a glass forming machine including a pick-up device for gripping formed glass articles, a dead pan, a rotatable shaft, two oppositely disposed cranks carried by the shaft, a connecting rod connecting one of said cranks with the pick-up device for moving the pick-up device to a position over the dead pan and back to its original position, a pusher bar arranged over the dead pan for conveying an article delivered by the pick-up device, and a connecting rod connecting the other of said oppositely disposed cranks with the pusher bar.

GEORGE R. HAUB.